July 11, 1933.   L. C. EVON   1,917,706
BIMETAL PISTON
Filed April 18, 1932
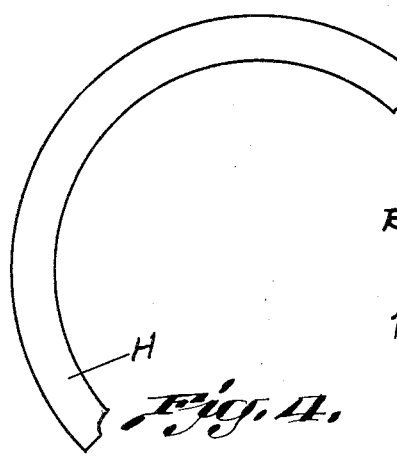
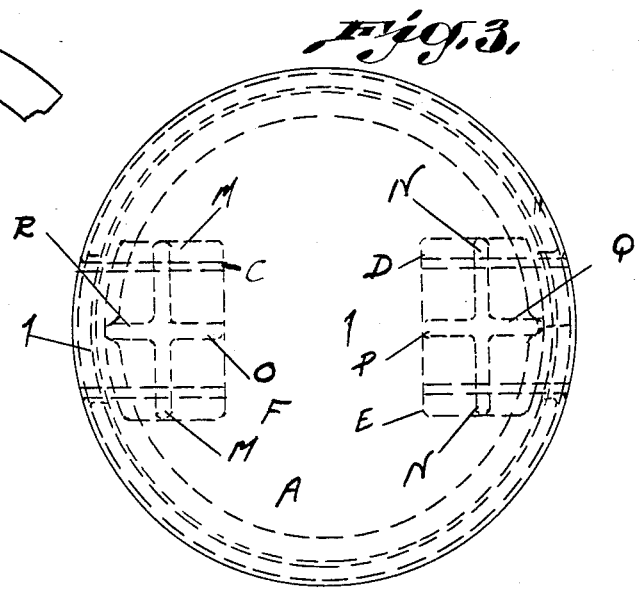
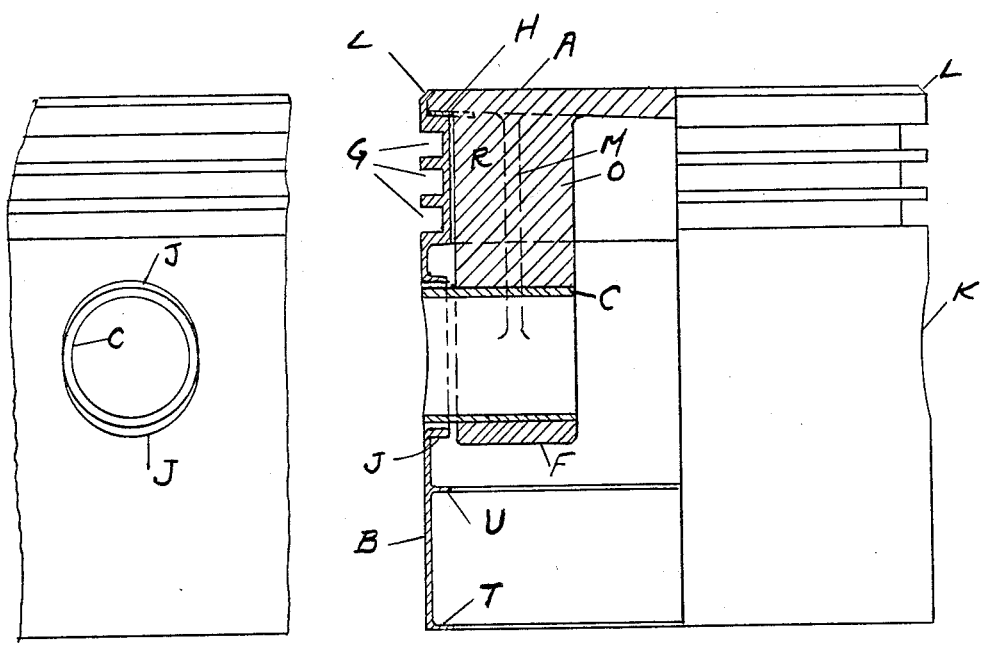
Louis C. Evon.
INVENTOR
BY
ATTORNEY Patented July 11, 1933

1,917,706

UNITED STATES PATENT OFFICE

LOUIS C. EVON, OF DETROIT, MICHIGAN

BIMETAL PISTON

Application filed April 18, 1932. Serial No. 605,906.

The invention relates to an improved means for locking the outside steel skirt to the aluminum head and bosses of a bimetal piston, whereby the skirt is held in axial alignment with the head by means of the bosses and the bosses are permitted to expand freely without distorting the skirt.

Fig. 1 shows a partial cross sectional elevation on plane 11 of Fig. 3.

Fig. 2 shows a partial side elevation of Fig. 1.

Fig. 3 shows a plan view of Fig. 1.

Fig. 4 shows a detail of one of the elements used in locking the skirt to the head.

In the figures:—

A represents the aluminum head and B the steel skirt. E and F are the bosses depending from the head A. These bosses are bored to take the two wrist pin bushes C, D. These bushes extend through the openings J, K in the skirt B. It will be noted that a considerable clearance is provided in the opening J (Fig. 2) and that this clearance permits the boss F to expand axially of the piston, but the opening is so made that the bushing C engages with the sides of the elongated opening J so that the side thrust of the piston is taken through the bushing C to the skirt B. The upper end of the skirt 13 is provided with the usual piston ring grooves G and with a thin cylindrical portion L which is spun over the head A to lock the skirt 13 to the head A. At the point of junction a split washer H (Fig. 4) is used to carry the crushing load. This washer H extends under the head A which is flat so as to give an enlarged supporting surface for the explosion load. Suitable ribs O, P—Q, R, M, N extend from the head A to the bosses E F so as to distribute the load over the head A.

The piston is assembled by inserting the split washers H in place and then spinning the thin lip L of the steel skirt B over the cylindrical shoulder of the head A. The split washer H is thus securely held in place. Before the lip L is spun into place the wrist pin bosses E, F are placed in alignment with the openings J, K by inserting the bushes C, D in the bosses E, F, so as to extend through the openings J, K skirt B.

In operation the skirt may be split both laterally and axially, both of which methods are well known and therefore not illustrated.

Stiffening ribs U and T are provided in the lower portion of the skirt B. The split washers H prevent the aluminum head being pounded on the steel skirt. The increased area offered by H decreases the load per square inch required to accelerate the mass of the skirt at maximum engine speed.

What I claim is:—

1. A bimetal piston having a light metal head and a skirt of a different material in locking engagement therewith, a pair of bosses integral with said head and depending therefrom, a pair of cylindrical wrist pin bushes in said bosses, elongated openings in said skirt the walls of which engage with said bushes laterally but adapted to permit axial movement of the bushes in said openings, for the purpose described.

2. Locking means for a bimetal piston having a light metal head and a steel skirt comprising a shoulder on the underside of said head, a corresponding shoulder on the upper portion of said skirt, a washer located between the two shoulders and extending under said head beyond said last mentioned shoulder to distribute the load over said head, a thin cylindrical projection from said skirt spun over said head, for the purpose described.

3. A bimetal piston comprising a light metal head, bosses integral therewith and depending therefrom, a skirt of relatively ductile metal in locking engagement with said head, ring grooves in said skirt, cylindrical bushes firmly fixed in said bosses and extending through said skirt, elongated openings in said skirt the walls of which engage laterally with said bushes, said bushes being permitted to move axially in said elongated openings, for the purpose described.

4. A trunk piston comprising an aluminum head, two wrist pin bosses depending from said head, a steel skirt extending from the top of the head to below the wrist pin bosses, piston ring grooves in said skirt, the head resting on the upper portion of the skirt containing the ring grooves, means for locking said head to the upper portion of said skirt, means projecting from said bosses through openings provided in said skirt, the walls of said openings being designed to receive the lateral thrust of the pin bosses and to permit relative axial movement between the bosses and skirt.

5. A piston having a light metallic head and wrist pin bosses formed integral therewith, cylindrical projections extending from said bosses, a tubular steel sleeve locked to the upper portion of the head and in slidable engagement with said cylindrical projections, so as to be held in axial alignment therewith and to transmit the side thrust from the skirt to the bosses through said cylindrical bosses.

6. A bimetal piston having a head and wrist pin bosses cast integrally of aluminum, a tubular steel skirt connected therewith, said skirt having piston ring grooves on its upper portion forming a shoulder, a cylindrical ring extending above said shoulder and spun over the head to lock the head to said skirt, a washer located on said shoulder and extending therefrom toward the center of the piston to distribute the load required to accelerate the skirt.

7. A bimetal piston having an aluminum head and bosses cast integral therewith, a skirt of different material extending the full length of said piston, piston ring grooves in said skirt, said skirt being locked to said head at its upper portion only, elongated openings in said skirt, projections from said bosses adapted to slide freely in said openings and to transmit the side thrust from said skirt through said projections to said bosses without imposing temperature strains thereon.

In testimony whereof he affixes his signature.

LOUIS C. EVON.